United States Patent [19]

Ogata et al.

[11] Patent Number: 4,636,248

[45] Date of Patent: Jan. 13, 1987

[54] METHOD FOR PRODUCTION OF DIELECTRIC POWDER

[75] Inventors: Yasuyuki Ogata; Yoshinori Shinohara, both of Saitama, Japan

[73] Assignee: Mitsubishi Mining & Cement Co., Ltd., Tokyo, Japan

[21] Appl. No.: 786,766

[22] Filed: Oct. 11, 1985

[30] Foreign Application Priority Data

May 30, 1985 [JP] Japan .................................. 60-117473

[51] Int. Cl.$^4$ ................................................ B22F 9/16
[52] U.S. Cl. ............................ 75/0.5 AA; 75/0.5 AB; 75/0.5 AC; 423/593; 252/62.3 R; 252/62.3 BT
[58] Field of Search ................... 423/593; 252/62.3 R, 252/62.3 BT; 75/0.5 AA, 0.5 AB, 0.5 AC

[56] References Cited

U.S. PATENT DOCUMENTS 4,054,532 10/1977 Hanke et al. ......................... 423/593
4,241,042 12/1980 Matijevic et al. .................... 423/610

Primary Examiner—John Doll
Assistant Examiner—Robert L. Stoll
Attorney, Agent, or Firm—Frank J. Jordan; C. Bruce Hamburg; Manabu Kanesaka

[57] ABSTRACT

A dielectric powder consisting of a solid solution of compounds selected at least one each from the two group (a) and (b) of compounds indicated below and having a chemical composition represented by the following general formula:

$$[ABO_3]_{1-x}[A'(B'_{1-y}B''_y)O_3]_x \qquad (I)$$

(Wherein x and y satisfy $0 < x < 1$ and $0 < y < 1$ respectively), is produced by mixing metal alkoxides in proportions such that the proportions of the metallic elements thereof conform to the proportions of the metallic elements in the aforementioned general formula (I) and hydrolyzing the metal alkoxides contained in the resultant mixture:

(a) Compounds of the $ABO_3$ type perovskite structure and
(b) Compounds of the $A'(B'_{\frac{1}{3}}B''_{\frac{2}{3}})O_3$, $A'(B'_{\frac{1}{2}}B''_{\frac{1}{2}})O_3$, or $A'(B'_{\frac{2}{3}}B''_{\frac{1}{3}})O_3$ type valency-compensating perovskite structure (wherein A and A' each denote a divalent metal, B a tetravalent metal, B' a divalent metal or a trivalent metal, and B" a pentavalent metal or a hexavalent metal).

9 Claims, No Drawings

METHOD FOR PRODUCTION OF DIELECTRIC POWDER

FIELD OF THE INVENTION AND RELATED ART STATEMENT

This invention relates to a method for the production of a dielectric powder, and more particularly to a method for the production of a highly dielectric powder formed of uniform, fine particles of high purity, having a low sintering temperature and suitable for use as a material for ceramic condensers.

A dielectric consisting of a solid solution of compounds selected at least one each from the two groups (a) and (b) of compounds indicated below and having a chemical composition represented by the following general formula (I) has a high dielectric characteristic and can be sintered at a low temperature:

(a) Compounds of the $ABO_3$ type perovskite structure represented by $BaTiO_3$ and (b) Compounds of the $A'(B'_{\frac{1}{3}}B''_{\frac{2}{3}})O_3$, $A'(B'_{\frac{1}{2}}B''_{\frac{1}{2}})O_3$, or $A'(B'_{\frac{2}{3}}B''_{\frac{1}{3}})O_3$ type valency-compensating perovskite structure represented by $Pb(Mg_{\frac{1}{3}}W_{\frac{2}{3}})O_3$ (where A and A' each denote a metal, B a tetravalent metal, B' a divalent metal or a trivalent metal, and B'' a pentavalent metal or a hexavalent metal), General formula:

$$[ABO_3]_{1-x}[A'(B'_{1-y}B''_y)O_3]_x \quad (I)$$

(wherein x and y satisfy $0 < x < 1$ and $0 < y < 1$ respectively).

Heretofore, the highly dielectric powder formed of compounds represented by the aforementioned general formula (I) has been produced by using the oxides of the component elements as starting materials and subjecting them to a solid-phase reaction in the process of calcination.

In this method of production resorting to the solid-phase reaction, however, the product obtained is required to be ground with a ball mill. During this step of grinding, with an attendant loss of entry of impurities into the product tents to occur with an attendant loss of purity. Further, grinding by the use of a ball mill has its own limit to produce fine particles and, it is very difficult to form a uniform size of particles by the grinding.

As means of obtaining fine particles, the liquid-phase reaction such as coprecipitation has been known to the art. In the case of a compound formed of many component elements as represented by the aforementioned general formula (I), however, desired coprecipitation of all the component elements is extremely difficult to attain because the individual component elements are precipitated under various conditions. It has been extremely difficult, therefore, to produce by the coprecipitation reaction a compound having the component elements contained therein in proportions conforming exactly to the proportions aimed at.

In the meantime, methods which produce ceramic powders from metal alkoxides as the starting material have been known to the art. All these methods, however, concern production of ceramic powders formed of two to three kinds of component elements. No literature has so far disclosed any method capable of producing a ceramic powder formed of many (for example, four or more kinds of) component elements as represented by the aforementioned general formula (I). This is because a ceramic powder formed of many component elements has its properties readily affected by the presence of only a small amount of impurities and cannot be easily produced in consistent quality.

OBJECT AND SUMMARY OF THE INVENTION

An object of this invention is to remove the drawbacks suffered by the conventional methods as described above and provide a method for the production of a dielectric powder of high purity and uniform composition.

Another object of this invention is to provide a method for the production of a dielectric powder formed of fine particles uniform in diameter.

A further object of this invention is to provide a method for the production of a dielectric powder possessing a low sintering temperature and excelling in dielectric characteristic.

The objects described above are accomplished by a method for production of a dielectric powder consisting of a solid solution of compounds selected at least one each from the two groups (a) and (b) of compounds indicated below and having a chemical composition represented by the following general formula:

$$[ABO_3]_{1-x}[A'(B'_{1-y}B''_y)O_3]_x \quad (I)$$

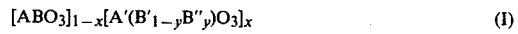

(wherein x and y satisfy $0 < x < 1$ and $0 < y < 1$ respectively), which method is characterized by comprising a step of mixing metal alkoxides in proportions such that the proportions of the metallic elements thereof conform to the proportions of the metallic elements in the aforementioned general formula (I) and a step of hydrolyzing the metal alkoxides contained in the resultant mixture:

(a) Compounds of the $ABO_3$ type perovskite structure and (b) Compounds of the $A'(B'_{\frac{1}{3}}B''_{\frac{2}{3}})O_3$, $A'(B'_{166}B''_{\frac{1}{2}})O_3$, or $A'(B'_{\frac{2}{3}}B''_{\frac{1}{3}})O_3$ type valency-compensating perovskite structure (Wherein A and A' each denote a divalent metal, B a tetravalent metal, B' a divalent metal or a trivalent metal, and B' a pentavalent metal or a hexavalent metal).

DETAILED DESCRIPTION OF PREFERRED EMBODIMENTS

Now, the present invention will be described in detail below.

This invention resides in a method for the production of a dielectric powder consisting of a solid solution of compounds selected at least one each from the aforementioned two groups (a) and (b) of compounds and having a chemical composition represented by the aforementioned general formula (I), which method is characterized by comprising a step of mixing metal alkoxides in proportions such that the proportions of the metallic elements thereof conform to the proportions of the metallic elements in the aforementioned general formula (I) and a step of hydrolyzing the metal alkoxides contained in the resultant mixture.

In the aforementioned general formula (I), the divalent metals of A and A' may be different from or equal to each other. Examples of the divalent metals include Mg, Ca, Sr, Ba, Mn, Fe, Co, Ni, Cu, Zn, Cd, and Pb. Examples of the tetravalent metal of B include Ti, Zr, Ce, and Sn. Examples of the divalent metal of B' are those of A and A' cited above, while examples of the trivalent metal of B' include Fe, Bi, and rare earth metals (yttrium and lanthanides). Examples of the pentavalent metal of B" are Nb and Ta and examples of the hexavalent metal of B" are Mo and W.

The metal alkoxides which are raw materials for the dielectric powder formed of such compounds as described above are desired, from the standpoint of reactivity, to be metal alkoxides formed with metals and such monohydric alcohols as methanol, ethanol, isopropanol, butanol, and amyl alcohol.

Any metal alkoxide to be used in the present invention is desired to contain impurities only in a limited amount of not more than 0.1 mol %, preferably not more than 0.05 mol %. If the metal alkoxide contains an alkali metal, this alkali metal reacts with the metal alkoxide and forms a double alkoxide, which possibly interferes with the formation of the compound aimed at or of the precursor thereof. If the presence of the alkali metal results in the formation of an alkali metal alkoxide, there ensues the possibility that when this alkali metal alkoxide is hydrolyzed, the pH of the reaction system resulting from the hydrolysis will tend toward a higher level to affect the composition of the product and prevent the product from precipitation.

The metal alkoxide having such a low content of impurities as described above can be prepared by a method disclosed in Japanese Patent Application laid-Open Nos. SHO 57(1982)-191231, SHO 58(1983)-2220, SHO 58(1983)-199719, SHO 58(1983)-199716, SHO 58(1983)-199717, SHO 60(1985)-86022, SHO 60(1985)-86026, or SHO 60(1985)-90826, or Japanese Patent Application Nos. SHO 59(1984)-207171, SHO 60(1985)-52332, or SHO 60(1985)-52331, for example. The methods thus disclosed are only examples of the method available for the production of the metal oxides usable in this invention. They are not meant to exclude use of metal oxides prepared by other methods.

For the purpose of the present invention, the mixing of necessary metal alkoxides is desired to be effected by dissolving the metal alkoxides in an organic solvent and stirring the resultant solution mechanically or by means of reflux or by both to thereby mix the same thoroughly Examples of the organic solvent usable advantageously in this case include benzene, toluene, xylene, and alcohols such as isopropanol and butanol.

When any of the metal alkoxides selected to be used happens to be insoluble in the organic solvent, it is desired to be combined with some other metal alkoxide and converted into a double alkoxide which is soluble in the organic solvent. Nickel ethoxide, $Ni(OEt)_2$, or cobalt ethoxide, $Co(OEt)_2$, for example, can be converted into $Ni[Nb(OEt)_6]_2$ or $Co[Nb(OEt)_6]_2$ which is soluble in the organic solvent by being mixed with $Nb(OEt)_5$ under reflux.

When the metal alkoxides are mixed in the form of solutions in an organic solvent, the hydrolysis in the subsequent step is enabled to proceed with exceptional uniformity. As the result, the dielectric powder which consists of a complicate solid solution formed of many component elements is allowed to be produced as contemplated by the present invention.

When the metal alkoxides are mixed as described above, the temperature of the reaction system during the mixture is only required to be lower than the temperatures at which the metal alkoxides involved undergo thermal decomposition. When they are mixed in an organic solvent, this temperature is desired to fall in the range of 0° to 100° C. to ensure ease of handling.

The mixed solution which is obtained by the mixture is then subjected to hydrolysis. This hydrolysis can be easily effected by directly adding water such as decarboxylated distilled water or deionized water to the mixed solution. Otherwise, a method which hydrolyzes the alkoxides in the mixed solution by directing into the mixed solution the steam which blows out of a pressure container can be adopted.

The temperature of this hydrolysis is desired to be high enough for the formation of crystalline oxide particles or precursor particles (amorphous particles or a mixture of amorphous particles and crystalline particles). To ensure ease of handlding, this temperature is desired to be selected specifically in the rnge of 0° to 100° C. When the hydrolysis is effected by the method resorting to forced introduction of steam into the mixed solution, it is proper for the temperature of the steam to be selected in the range of 100° to 200° C.

The hydrolysis gives rise to a precipitate. In most cases, the precipitate occurs in the form of completely discrete, minimally cohesive particles. The powder aimed at is obtained by separating the precipitate with a filter and drying the separated precipitate.

More often than not, the powder which is obtained by the method of this invention is in an amorphous state. This amorphous powder can be easily converted into a crystalline highly dielectric powder by being heated at a low temperature. The heating temperature and other conditions advantageous for the conversion of the amorphous powder into the crystalline highly dielectric powder depend on the composition of the powder and other factors. Generally, however, the heating temperature is desired to be fixed in the range of 400° to 800° C., specifically in the neighborhood of 600° C.

The particle diameter of the dielectric powder which is obtained by the method of this invention, as calculated based on the BET specific surface area, is about 0.1 $\mu$m after the powder has been calcined at 600° C. By observation under an electron microscope, this powder is found to cosist of particles of high uniform diameters.

The dielectric powder which is obtained as described above can be easly sintered at a low temperature generally in the range of 800° to 1200° C., particularly 850° to 1000° C., though this temperature is variable with the composition of the powder.

As described in detail above, the method for the production of a dielectric powder according to this invention comprises using metal alkoxides as the starting material, mixing the metal alkoxides, and hydrolyzing the resultant mixture. By this method, the compound formed of the component elements represented by the aforementioned general formula (I) can be produced in a state of high purity and uniform composition. The dielectric powder produced by the method of this invention possesses a low sintering temperature and enjoys high purity and uniform composition. It also possesses an outstanding dielectric characteristic. By properly selecting production conditions, a highly dielectric powder formed of fine particles of uniform diameters can be easily produced.

Now, the present invention will be described more specifically below with reference to working examples. This invention is not limited to the working examples so cited but may be practised otherwise without departing from the spirit of the invention disclosed herein.

EXAMPLE 1

Lead butoxide, Pb(OBu)$_2$, strontium isopropoxide, Sr(Oi-Pr)$_2$, titanium isopropoxide, Ti(Oi-Pr)$_4$, magnesium methoxide, Mg(OMe)$_2$, and tungsten methoxide, W(OMe)$_5$, were prepared so that none of the metal alkoxides would contain alkali metal impurities in a concentration of more than 0.05 mol%. By using benzene as a common solvent, these metal alkoxides were mixed in a composition ratio of [PbTiO$_3$]$_{0.4}$[Pb(Mg$_{1/78}$W$_{\frac{1}{2}}$)O$_3$]$_{0.6}$ or a composition ratio of [(Sr$_{0.1}$Pb$_{0.3}$)TiO$_{0.3}$]$_{0.4}$[Pb(Mg$_{\frac{1}{2}}$W$_{\frac{1}{2}}$)O$_3$]$_{0.6}$. Each resultant mixture was refluxed for reaction at a temperature of 70° C. for three hours. The mixed solution consequently obtained was hydrolyzed by addition thereto of decarboxylated distilled water, to obtain a precipitate. This precipitate was separated by filtration and dried at 70° C. to form a powder.

Each dry powder, on X-ray diffraction, was found to be in an amorphous state. This powder was calcined at 600° C. for one hour. When the calcined powder was analyzed by X-ray diffraction, the X-ray diffraction pattern consequently obtained identified the powder to be a highly dielectic crystalline powder of (PbTOi$_3$)$_{0.4}$[Pb(Mg$_{\frac{1}{2}}$W$_{\frac{1}{2}}$)O$_3$]0.6 or [(Sr$_{0.1}$Pb$_{0.3}$)TiO$_3$)$_{0.4}$[Pb(Mg$_{\frac{1}{2}}$W$_{\frac{1}{2}}$)O$_3$]$_{0.6}$. The particle diameter of the powder after calcinatioin at 600° C., as calculated based on the BET specific surface area, was found to be about 0.1 μm. By observation under an electron microscope, the particles of the powder were confirmed to possess uniform diameters.

The [PbTiO$_3$]$_{0.4}$[Pb(Mg$_{\frac{1}{2}}$W$_{\frac{1}{2}}$)O$_3$]$_{0.6}$ powder resulting from one hour's calcination at 600° C. was fired at 1000° C. for one hour to produce pellets of sintered powder. By test, the pellets were found to exhibit permeablity of 7500 to 8000 and dielectric loss tangent of 0.005 to 0.15. These data evince the powder to be an outstanding dielectric substance.

EXAMPLE 2

The procedure of Example 1 was repeated, except that lead butoxide, Pb(OBu)$_2$, titanium isopropoxide, Ti(Oi-Pr)$_4$, iron ethoxide, Fe(OEt)$_3$, tungsten methoxide, W(OMe)$_5$, nickel ethoxide, Ni(OEt)$_2$, and niobium ethoxide, Nb(OEt)$_5$ were mixed in a composition ratio of [PbTiO$_3$]$_{0.25}$[Pb(Fe$_{\frac{2}{3}}$W$_{\frac{1}{3}}$)O$_3$]$_{0.75}$ or in a composition ratio of [Pb(Ni$_{\frac{1}{3}}$Nb$_{\frac{2}{3}}$)O$_3$]$_{0.1}$. The resultant mixed solution was hydrolyzed, to produce a precipitate. None of the metal alkoxides used herein contained impurities in an amount of more than 0.05 mol%. Since Ni(OEt)$_2$ was insoluble in the organic solvent, it was combined with Nb(OEt)$_5$ and consequently converted into a complex alkoxide, Ni[Nb(OEt)$_6$]$_2$, so as to be mixed as dissolved in the organic solvent.

The precipitate consequently formed was separated by filtration and dried at 70° C. for two hours, to produce a powder. The dry powder, on X-ray diffraction, was found to be in an amorphous state. When this amorphous powder was calcined at 600° C. for one hour, there was obtained a crystalline powder of the same composition. The crystalline powder was found to be formed of particles having diameters of about 0.1 μm. The particle diameters were highly uniform.

EXAMPLE 3

Barium isopropoxide, Ba(Oi-Pr)$_2$, lead butoxide, Pb(OBu)$_2$, titanium isopropoxide, Ti(Oi-Pr)$_4$, Zirconium isopropoxide, Zr(Oi-Pr)$_4$, magnesium methoxide, Mg(OMe)$_2$, tungsten methoxide, W(OMe)$_5$, tin isopropoxide, Si(Oi-Pr)$_4$, lanthanum ethoxide, La(OEt)$_3$, tantalum isopropoxide, Ta(Oi-Pr)$_5$, bismuth ethoxide, Bi(OEt)$_3$, and niobium ethoxide, Nb(OEt)$_5$, were prepared so that none of the metal alkoxides would contain alkali metal impurities in a concentration of more than 0.05 mol%. By following the procedure of Example 1, these metal alkoxides were mixed to produce powders of [Pb(Ti$_{0.3}$Zr$_{0.7}$)O$_3$]$_{0.4}$[Pb(Mg$_{\frac{1}{3}}$Nb$_{\frac{2}{3}}$)O$_3$]$_{0.6}$, [BaTiO$_3$]$_{0.1}$[Pb(Ti$_{0.3}$Zr$_{0.7}$)O$_3$]$_{0.3}$[Pb(Mg$_{\frac{1}{3}}$Nb$_{\frac{2}{3}}$)O$_3$]0.6, [(Ba$_{0.1}$Pb$_{0.9}$)(Ti$_{0.8}$Zr$_{0.2}$)O$_{0.3}$]$_{0.4}$[Pb(Mg$_{\frac{1}{2}}$W$_{\frac{1}{2}}$)O$_3$]$_{0.6}$, [Pb(Ti$_{0.9}$Sn$_{0.1}$)O$_3$]$_{0.4}$[Pb(Mg$_{\frac{1}{2}}$W$_{\frac{1}{2}}$)O$_3$]$_{0.6}$, [PbTiO$_3$]$_{0.3}$[Pb(Mg$_{\frac{1}{2}}$W$_{\frac{1}{2}}$)O$_3$]$_{0.6}$[Ba(La$_{\frac{1}{2}}$Ta$_{\frac{1}{2}}$)O$_3$]$_{0.1}$, and [PbTiO$_3$]$_{0.2}$[Pb(Mg$_{\frac{1}{2}}$W$_{\frac{1}{2}}$)O$_3$]$_{0.7}$[Pb(Bi$_{\frac{2}{3}}$W$_{\frac{1}{3}}$)O$_3$]$_{0.1}$.

When these powders were subjected to X-ray diffraction, the X-ray diffraction paterns consequently obtained identified the powders to be those of the compositions indicated above. The particle diameters, as calculated based on BET specific surface area, were found to be about 0.1 μm. By observation under an electron microscope, these particles were confirmed to have uniform diameters.

We claim:

1. A method for the production of a dielectric powder consisting of a solid solution of compounds selected at least one each from the two groups (a) and (b) of compounds indicated below: (a) Compounds of the ABO$_3$ pervoskite structure and (b) Compounds of the A'(B'$_{\frac{1}{2}}$B''$_{\frac{1}{2}}$)O$_3$, A'(B'$_{\frac{1}{3}}$B''$_{\frac{2}{3}}$) O$_3$, or A'(B'$_{\frac{2}{3}}$ $_{B''\frac{1}{3}}$)O$_3$ valency-compensating pervoskite structure, wherein A and A' each denotes a divalent metal, B a tetravalent metal, B' a divalent metal or a trivalent metal, and B'' a pentavalent metal or a hexavalent metal, said dielectric powders having a chemical composition represented by the following general formula:

$$[ABO_3]_{1-x}[A'(B'_{1-y}B''_y)O_3]_x \qquad (I)$$

wherein x and y satisfy $0<x<1$ and $0<y<1$ respectively said method comprising dissolving and mixing metal alkoxides having a purity of at 99.9 mol% in at least one organic solvent in proportion such that proportions of the metallic elements of the metal alkoxides conform to the proportions of the metallic elements in said general formula (I);

adding water or steam at a temperature of 0°-200° C. mixture to the solution thereby to hydrolyze the metal alkoxides whereupon the hydrolyzed mixture of metal alkoxides precipitates; and separating the precipitate from the liquid and drying the precipitate to obtain said dielectric powder.

2. A method according to claim 1 wherein prior to dissolving said metal alkoxides in the organic solvent, any said metal alkoxide which is unsoluble in the organic solvent is combined with another metal alkoxide so selected that the resultant double alkoxide is soluble in the organic solvent.

3. A method according to claim 1, wherein at least some of said metal alkoxides are dissolved in the orgnaic solvent and the resultant solution is used in said step of mixing.

4. A method according to claim 1, wherein said divalent metals of A and A' in said general formula (I) are members selected from the group consisting of Mg, Ca, Sr, Ba, Mn, Fe, Co, Ni, Cu, Zn, Cd, and Pb.

5. A method according to claim 1, wherein said tetravalent metal of B in said general formula (I) is a member selected from the gorup consisting of Ti, Zr, Ce, and Sn.

6. A method according to claim 1, wherein said divalent metal of B' in said general formula (I) is one member selected from the group consisting of Mg, Ca, Sr, Ba, Mn, Fe, Co, Ni, Cu, Zn, Cd, and Pb and said trivalent metal of B' is one member selected from the group consisting of Fe, Bi, and rare earth metals.

7. A method according to claim 1, wherein said pentavalent metal of B'' in said general formula (I) is Nb or Ta and said hexavalent metal of B'' is Mo or W.

8. A method according to claim 1, wherein said metal alkoxides each comprise a metal and a monohydric alcohol.

9. A method according to claim 3, wherein said organic solvent is one member selected from the group consisting of benzene, toluene, xylene, isopropanol, and butanol.

* * * * *